E. FIXARY.
Freezing Apparatus.
No. 204,961. Patented June 18, 1878.
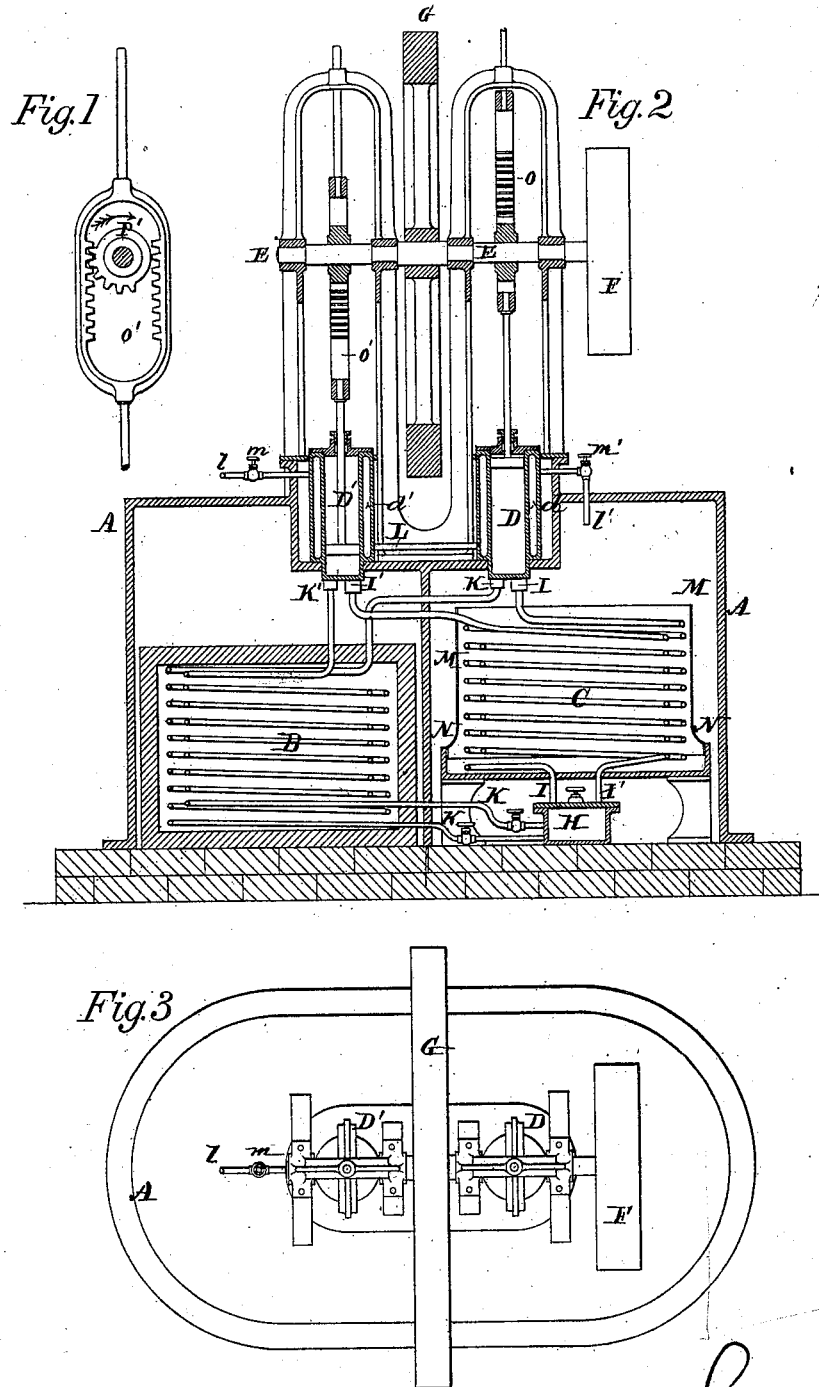

UNITED STATES PATENT OFFICE.

EDWARD FIXARY, OF NEW ORLEANS, LOUISIANA.

IMPROVEMENT IN FREEZING APPARATUS.

Specification forming part of Letters Patent No. 204,961, dated June 18, 1878; application filed February 27, 1878.

*To all whom it may concern:*

Be it known that I, EDWARD FIXARY, of New Orleans, in the parish of Orleans and State of Louisiana, have invented a new and useful Improvement in Apparatus for Producing Cold for Freezing or Refrigerating Purposes, which improvement is fully set forth in the following specification.

In ice-machines as heretofore constructed, operating on the principle of alternate condensation and vaporization of ether, ammonia, or other liquid but highly-volatile substances, difficulties have been experienced owing to the great speed with which it was deemed as a matter of necessity that these machines should be operated—a necessity growing out of the nature of the materials to be operated upon, as well as the machinery employed, and from other reasons, as will more fully appear when it will be considered that the relative value of volatile substances used for the purposes of refrigeration depends, first, on the temperature at which they are converted into vapor; second, on the tension of the respective vapors at the same temperature; and, third, on the amount of calorics which they are respectively capable of absorbing.

To illustrate: Ammonia boils and becomes gaseous at 28° below zero at the ordinary pressure of the atmosphere, while ether at the same pressure will vaporize at 95° above zero. It will be seen, therefore, that ammonia, in point of vaporization, has the advantage over ether by 123° Fahrenheit.

The vapor of ammonia at 104° Fahrenheit has a tension of over four hundred and fifty inches of the mercury-scale. That of ether has only about thirty-five, which makes the power of expansion of ammonia about thirteen times as great as in ether at the same temperature. The amount of heat the ammonia is capable of absorbing and making latent is about six times as great as that of ether. Considering these facts, I came to the conclusion that, with a machine in which ammonia is used as a refrigerant, one ought to freeze six times quicker than with an ether-machine running at the same speed; but I have observed that with both machines the freezing process takes place in about the same length of time. The reason of this is that, owing to their great tension, the vapors of ammonia will promptly accumulate into refrigerating or vaporizing part of the machine, and as the condensation cannot take place as rapidly as the vaporization, and as, on account of this accumulation, the resistance increases, it follows that the vapors will pass around the piston, which would cause the machine, if operated by crank, to stop on its dead-points unless run very rapidly; and the other reason is that this accumulation of vapors prevents them from producing their full frigorific effect.

The object of my invention, therefore, is to avoid sudden compression of the vapors, whereby the apparatus in which such compression is effected is necessarily caused to leak and to fill the room in which it is operated with gases or vapors, which are both offensive and a source of great loss of material.

My further object is to obtain the greatest possible frigorific effect from a given quantity of volatile substance.

Another object I have in view is to reduce as much as possible the cost of power and of machinery to produce a given effect; and, lastly, in reducing as much as possible the wear and tear of machinery.

To this end my invention consists in the construction and arrangement and operation of apparatus for producing cold for freezing or refrigerating purposes, whereby I am enabled to overcome the resistance attending the accumulation of vapors gradually or progressively and perfectly without any appreciable loss of gases or vapors, avoiding as much as possible violent and sudden compression, which would necessarily cause the gases to escape or the machine to give way, and which is always attended with destructive jars and concussions, both of which are wasteful of power and machinery, whereby, also, I am enabled to produce the maximum frigorific effect in a given time from a given substance.

And my invention therefore may be stated to consist, first, in the combination of two alternately condensing and vaporizing cylinders with two sets of coils, arranged respectively in a refrigerating-tank and a condensing-chamber, both sets of coils being connected with a receiver, as hereinafter described; second, in the combination, with two cylinders, alternately and simultaneously condensing and vaporizing volatile substances, as hereinafter described, said cylinders being connected with the receiver through the medium of two sets of coils in the refrigerating-tank and condensing-chamber respectively, of a double rack and sectional pinion, arranged in relation to the driving-shaft in such a manner as to work alternately the pistons in their respective cylinders, or of any mechanical equivalent of the same, whereby the said pistons may be moved in their respective cylinders in opposite directions simultaneously and at an equable speed and with uniform power, substantially as hereinafter described; third, in the combination, with alternately condensing and vaporizing cylinders, of intercommunicating water-jackets and suitable water supply and discharge, so arranged that a flow of water shall be maintained around the two cylinders, for the purposes and in the manner hereinafter described; fourth, in the combination, with the condensing pipes or coils, and arranged to surround the same, of a material absorbent of water, and whether the same is used with or without an air-agitating mechanism, as hereinafter described; fifth, in the process or method herein described of producing cold for freezing or refrigerating purposes by comparatively slow condensation and vaporization of the volatile substances by means of pumps, in which alternate and simultaneous condensation and vaporization of the volatile substance is effected by pistons moving at a comparatively low rate of speed.

To enable others to make and use my said invention, I shall now proceed to describe the manner in which the same is or may be carried into effect.

The apparatus constructed in accordance with my invention is established upon a solid foundation, onto which a frame or skeleton inclosure, A, is secured. This frame contains a refrigerating-tank, B, and a condensing-chamber, C. The frame constitutes also the support of the cylinders D D', also of the driving-shaft E, which receives rotary movement from a prime mover and belt passing over the pulley F, mounted on the shaft E, which, in its turn, carries a fly-wheel, G, as fully shown in Figs. 2 and 3, which are respectively a sectional elevation and plan view of the machine.

The volatile substance, whether it be ammonia, ether, or anhydrous sulphurous oxide or other substance, is placed in a receiver, H, located preferably under the condenser C. From the top of said receiver proceed two independent pipes, I I', the one constituting the exterior, the other the interior, coil of pipes in the condensing-chamber, the former, I, being connected with the lower part of the pump D, while the other, I', is connected with the lower part of the pump D'. From the side of said receiver proceed two pipes, K K', constituting, respectively, the interior and exterior coil of pipes in the refrigerating-tank B, and terminating thus: pipe K' in the lower end of D' and pipe K in the lower end of D. The pumps consist of cylinders surrounded by jackets or second cylinders d d', which jackets intercommunicate by means of a pipe, L. The two jackets surrounding the two cylinders D D' are thus made communicating vessels, which are connected with a water-supply tank by means of pipes l and l'. These are provided with suitable cocks m and m', the former to cut off, if necessary, the supply of water from the tank to jacket d'; the latter to cut off from the jacket d the shower upon the condensing-tubes. The discharge-pipe should be provided with a suitable nozzle or rose, to discharge the water which passes through the two jackets in the form of a shower upon the coil of pipes in the condensing-chamber.

I prefer to inclose the pipes in, or cover them with, cloth or canvas or other water-absorbent material, for which purpose a skeleton frame, M, may be arranged to surround the coils, as shown in Fig. 2. The excess of water is collected in the base or dripcup N, whence it may be carried off by any suitable pipe.

Each pump is provided with a piston, the piston-rod passing through a stuffing-box in the head of the cylinder. Each rod carries on its upper part a double rack, O O'. This consists of an oblong loop, upon the interior opposite long sides of which are cut teeth, forming racks of a length equal, or nearly so, to the length of the cylinders. This open rack contains within itself the shaft E, upon which is mounted the pinion P, little or over one-half of whose circumference is toothless, so that it shall mesh in with the rack during part only of its revolution.

In Fig. 1 I have shown a side view of the rack and pinion in position, with respect to the piston in the cylinder D' shown in Fig. 2.

It will be seen that revolution of the pinion in the direction of the arrow will lift the piston until it shall have reached the upper part of the cylinder. The other pinion in the rack of the other piston, being of similar construction, but placed in diametrically opposite position, will engage its rack at the same time when the other is released, and vice versa, so that one pinion is always engaged with one of the racks, and therefore the power applied on the driving-shaft will always be the same, or nearly so.

It will be understood that, by the arrangement shown and explained, the two pistons in their corresponding cylinders move in unison, but in opposite directions, and have a uniform motion.

Other devices embodying the principle of my invention may be made, and will readily suggest themselves to any competent mechanic or engineer, whereby a uniform reciprocating motion is obtained for the working of pump or pumps used to vaporize and condense volatile liquids. I have shown it as derived from and produced by crank revolving continuously in the same direction. Like results may be obtained, however, by the employment of a crank having an oscillatory movement, or by combining with such crank suitable cams to transmit rotation and convert the same into a uniform reciprocating movement.

I prefer to allow a slight difference between the positions of the pistons at the ends of their respective strokes. As indicated in the drawings, the piston in pump D has reached the top and is about to recede before the piston in the pump D' has reached the bottom. The object of this is to allow the latter piston to finish its stroke before the counter-pressure due to the descent of the piston in pump D is felt.

The operation of the apparatus thus described will be as follows: The coils being presumed to be filled with gas emanating from the receiver H, the apparatus in the position shown in Fig. 2 will now be actuated to condense the vapors by the downward stroke of the piston in pump D, the valve at the bottom of the cylinder allowing the gases to be expelled or forced into the pipe I, but not to return into the cylinder.

The gas, owing to the great pressure to which it is subjected, and the effect of the evaporation going on around the pipes, will be condensed and forced back in a liquid condition into the receiver H. It is important that this compression and condensation of the gas should proceed slowly, for violent and sudden compression would necessarily produce leaks or rupture. As gas is compressed in the cylinder D it is expanded by the ascending movement of the piston in cylinder D', the valve in the bottom of which cylinder allows of the entrance into the cylinder of the contents of pipes K', but not to return into the pipes, and thus producing intense cold in the refrigerating-tank and in the jacket surrounding the pump.

The water, therefore, which enters the jacket of pump D' during the ascending course of the piston will become intensely cold, and, as such, become an important auxiliary to the condensing action of the piston in the pump D. The functions of the two pumps are reversed at the end of their strokes, and the cylinder in which condensation took place will now become a gas-expanding cylinder, while the other cylinder in which expansion took place will now act as a condenser.

Condensation in the condensing-chamber may be accelerated by agitating the air by means of fans or other mechanism, as described in one of my former patents, dated June 26, 1877.

Having thus fully described my said invention, what I claim, and desire to secure by Letters Patent, is—

1. The combination of two alternately condensing and vaporizing cylinders with two sets of coils, arranged respectively in a refrigerating-tank and a condensing-chamber, both sets of coils being connected with a receiver, as herein described.

2. The combination, with two cylinders, alternately and simultaneously condensing and vaporizing volatile substances, as herein described, said cylinders being connected with the receiver through the medium of two sets of coils in the refrigerating-tank and condensing-chamber respectively, of a double rack and sectional pinion, arranged in relation to the driving-shaft, as described, or of the mechanical equivalent of the same, whereby the pistons work alternately in their respective cylinders, and are moved in said cylinders in opposite directions simultaneously and at an equable speed and with uniform power, substantially as herein described.

3. The combination, with alternate condensing and vaporizing cylinders, of intercommunicating water-jackets and suitable water supply and discharge, arranged as described, whereby a flow of water is maintained around the two cylinders, for the purposes and in the manner herein described.

4. The combination, with the condensing pipes or coils, of a frame for supporting around said pipes a material absorbent of water, and whether the same is used with or without an air-agitating mechanism, as herein described.

In testimony whereof I have signed this specification in the presence of two subscribing witnesses.

EDWARD FIXARY.

Witnesses:
E. A. DICK,
W. T. HUTCHINSON.